(12) United States Patent
Kato et al.

(10) Patent No.: US 7,883,811 B2
(45) Date of Patent: Feb. 8, 2011

(54) CONTROL APPARATUS FOR FUEL CELL STACK

(75) Inventors: Hideo Kato, Utsunomiya (JP); Katsumi Hayashi, Utsunomiya (JP); Hideo Okamoto, Utsunomiya (JP); Masahiko Sato, Utsunomiya (JP)

(73) Assignee: Honda Giken Koygo Kabushiki Kaisha, Tokyo (JP)

( * ) Notice: Subject to any disclaimer, the term of this patent is extended or adjusted under 35 U.S.C. 154(b) by 1854 days.

(21) Appl. No.: 10/658,148

(22) Filed: Sep. 9, 2003

(65) Prior Publication Data

US 2004/0053092 A1    Mar. 18, 2004

(30) Foreign Application Priority Data

Sep. 18, 2002    (JP) .............................. 2002-271633

(51) Int. Cl.
   *H01M 8/04*    (2006.01)
   *H01M 8/10*    (2006.01)

(52) U.S. Cl. .................. 429/443; 429/434; 429/479; 429/433; 429/436

(58) Field of Classification Search .................. 429/22, 429/26, 24, 34, 13
   See application file for complete search history.

(56) References Cited

U.S. PATENT DOCUMENTS

| | | | | |
|---|---|---|---|---|
| 5,009,968 | A * | 4/1991 | Guthrie et al. ................. | 429/26 |
| 5,132,174 | A * | 7/1992 | Romanowski et al. ......... | 429/26 |
| 5,302,471 | A * | 4/1994 | Ito et al. ........................ | 429/24 |
| 6,727,013 | B2 * | 4/2004 | Wheat et al. ................... | 429/24 |
| 6,887,601 | B2 * | 5/2005 | Moulthrop et al. ............. | 429/17 |
| 6,887,606 | B2 * | 5/2005 | Parr et al. ...................... | 429/22 |
| 7,020,562 | B2 * | 3/2006 | Lillis et al. .................... | 702/23 |
| 2002/0146610 | A1 * | 10/2002 | Hayashi et al. ................ | 429/30 |
| 2003/0003330 | A1 * | 1/2003 | Ballantine et al. ............. | 429/13 |
| 2004/0013923 | A1 * | 1/2004 | Molter et al. .................. | 429/25 |
| 2004/0081870 | A1 * | 4/2004 | Miyazawa et al. ............. | 429/24 |
| 2004/0151954 | A1 * | 8/2004 | Ooma et al. ................... | 429/12 |
| 2005/0112418 | A1 * | 5/2005 | Roberts et al. ................. | 429/13 |
| 2005/0112423 | A1 * | 5/2005 | Omoto et al. .................. | 429/20 |

FOREIGN PATENT DOCUMENTS

| | | | |
|---|---|---|---|
| EP | 1283558 | A2 * | 7/2002 |
| JP | S61-233975 | | 10/1986 |
| JP | S63-26962 | | 2/1988 |
| JP | 64-027164 | | 1/1989 |

(Continued)

*Primary Examiner*—Dah-Wei Yuan
*Assistant Examiner*—Angela J. Martin
(74) *Attorney, Agent, or Firm*—Fish & Richardson P.C.

(57) ABSTRACT

A control apparatus for a fuel cell stack includes a fuel cell stack having a stacked body formed by stacking fuel cell units together and a pair of end plates sandwiching the stacked body therebetween; electrical heaters disposed near the ends of the stacked body or the end plates, respectively; a water purging device for purging water which is generated during a power generation operation in the fuel cell stack, and which is held in the fuel cell units; and a control unit which controls the power generation operation in the fuel cell stack, and which is operatively connected to the electrical heaters and the water purging device. The control unit is adapted to operate the electrical heaters and the water purging device when the power generation operation is stopped.

11 Claims, 8 Drawing Sheets

FOREIGN PATENT DOCUMENTS

| | | |
|---|---|---|
| JP | S64-18577 | 1/1989 |
| JP | H4-282567 | 10/1992 |
| JP | H4-308662 | 10/1992 |
| JP | 05-047397 | 2/1993 |
| JP | H5-89900 | 4/1993 |
| JP | 06-068893 * | 3/1994 |
| JP | H6-68893 | 3/1994 |
| JP | 08-167424 * | 6/1996 |
| JP | H8-167424 | 6/1996 |
| JP | H8-306380 | 11/1996 |
| JP | 2002-246054 | 8/2002 |

* cited by examiner

CONTROL APPARATUS FOR FUEL CELL STACK

BACKGROUND OF THE INVENTION

1. Field of the Invention

The present invention relates to a control apparatus for a fuel cell stack which includes a stacked body consisting of fuel cell units stacked together, and a pair of end plates which together sandwich the stacked body.

2. Description of the Related Art

In general, a solid polymer electrolyte fuel cell stack includes a plurality of fuel cell units, each of which includes a membrane electrode assembly, which is formed by sandwiching a polymer ion exchange membrane (i.e., a cation-exchange membrane) as an electrolyte membrane by an anode electrode and a cathode electrode, and a pair of separators which together hold the membrane electrode assembly. Such a solid polymer electrolyte fuel cell stack is practically used as a fuel cell stack having a predetermined number of fuel cell units being stacked together.

In such a fuel cell stack, a fuel gas (e.g., hydrogen gas) supplied to the anode electrode is ionized on a catalytic electrode, and moves to the cathode electrode through the electrolyte membrane which is moderately moistened. The electrons produced during this process are sent to an exterior circuit, and used as DC energy. Because the cathode electrode is provided with an oxidizing gas (e.g., air containing oxygen), water is generated at the cathode electrode through the reaction of the hydrogen ions, the electrons, and oxygen. This water is, hereinafter, referred to as "generated water" when appropriate. The amount of such water held in the fuel cell stack increases as the power generation in the fuel cell stack continues.

In addition, because the power generation reaction is accompanied by heat, the temperature of the fuel cell stack increases as the power generation in the fuel cell stack continues. A technique is known in the art in which a cooling medium is supplied to a fuel cell stack in order to maintain the temperature of the fuel cell stack within an appropriate range (see, for example, Japanese Unexamined Patent Application, First Publication No. Sho 64-27164).

In the above published Patent Application, a technique is disclosed in which an electrical heater is provided for heating the cooling medium as necessary, and when the temperature of the fuel cell stack is decreased during a slow power generation operation, the electrical heater is operated, and the cooling medium heated by the electrical heater is supplied to each of fuel cell units so that the entire fuel cell stack is warmed up.

In general, the fuel cell units disposed near the ends of the fuel cell stack tend to have more influence of the exterior temperature than in the case of the fuel cell units disposed in the middle portion of the fuel cell stack. Therefore, the variation of temperature in the fuel cell units cannot be reduced even when the heated cooling medium is supplied to the fuel cell stack, and the temperature of the fuel cell units disposed near the ends of the fuel cell stack tends to be lower than that of the fuel cell units disposed in the middle portion of the fuel cell stack when the power generation operation is stopped and supply of heat is stopped. Accordingly, even when substantially the same electrical power is generated in each of the fuel cell units and substantially the same amount of water is generated in each of the fuel cell units, relative humidity in the fuel cell units disposed near the ends of the fuel cell stack tends to be higher than that in the fuel cell units disposed in the middle portion of the fuel cell stack because the temperature of the fuel cell units disposed near the ends of the fuel cell stack tends to be lower than that of the fuel cell units disposed in the middle portion of the fuel cell stack; therefore, the amount of water held in the fuel cell units disposed near the ends of the fuel cell stack tends to be greater than that in the fuel cell units disposed in the middle portion of the fuel cell stack. As a result, in particular, the fuel cell units disposed near the ends of the fuel cell stack may have a problem in that water held in the fuel cell units freezes under low temperature conditions. If the water has frozen, the water (i.e., ice) inhibits the reaction gases (the fuel gas and oxidizing gas) from being sufficiently supplied to the anode electrode and the cathode electrode of the fuel cell units when the reaction gases are supplied to the fuel cell stack. As a result, the efficiency of power generation is decreased.

SUMMARY OF THE INVENTION

In view of the above circumstances, an object of the present invention is to provide a control apparatus for a fuel cell stack which enables prevention of decrease in the efficiency of power generation at the restarting of the fuel cell stack.

In order to achieve the above object, the present invention provides a control apparatus for a fuel cell stack including: a fuel cell stack having a stacked body formed by stacking fuel cell units together and a pair of end plates sandwiching the stacked body therebetween; electrical heaters disposed near the ends of the stacked body or the end plates, respectively; a water purging device for purging water which is generated during a power generation operation in the fuel cell stack, and which is held in the fuel cell units; and a control unit which controls the power generation operation in the fuel cell stack, and which is operatively connected to the electrical heaters and the water purging device, wherein the control unit is adapted to operate the electrical heaters and the water purging device when the power generation operation is stopped.

According to the control apparatus for a fuel cell stack configured as described above, the control unit operates the electrical heaters so that the fuel cell units disposed near the ends of the fuel cell stack are warmed up; therefore, decrease in the temperature of the end fuel cell units can be prevented when the power generation in the fuel cell stack is stopped. As a result, the temperature of the fuel cell units can be made uniform, and the relative humidity in the fuel cell units can be made uniform when the power generation in the fuel cell stack is stopped. By executing a purging operation for the water held in each of the fuel cell units in this state, the water held in the fuel cell units can be uniformly discharged. Accordingly, the end fuel cell units may not have surplus water therein after the purging operation, and thus the efficiency of power generation at the restarting of the fuel cell stack can be increased.

In the above control apparatus for a fuel cell stack, the control unit may be adapted to operate the electrical heaters and the water purging device prior to stopping of the power generation operation.

In the above control apparatus for a fuel cell stack, the control unit may be adapted to operate the electrical heaters first, and then to operate the water purging device when a predetermined time has passed since the beginning of operation of the electrical heaters.

According to the above control apparatus for a fuel cell stack, the relative humidity in the fuel cell units can be made substantially uniform, and the water held in the fuel cell units can be more reliably discharged.

In the above control apparatus for a fuel cell stack, the control unit may be adapted to simultaneously operate the electrical heaters and the water purging device.

According to the above control apparatus for a fuel cell stack, because the heating operation for warming the fuel stack using the electrical heaters and the purging operation for discharging the water held in the fuel cell units are simultaneously executed, the time for completing discharging of water can be made less than in the case in which the purging operation is executed after the heating operation, and the power generation operation may be stopped earlier.

In the above control apparatus for a fuel cell stack, each of the electrical heaters may be disposed between each of the end plates and one of the fuel cell units disposed at each end of the fuel cell stack.

In the control apparatus for a fuel cell stack, the fuel cell stack may further include a pair of terminal plates each of which is disposed between each of the end plate and one of the fuel cell units disposed at each end of the fuel cell stack, and each of the electrical heaters may be embedded in each of the terminal plates.

In the control apparatus for a fuel cell stack, the fuel cell stack may further include a pair of terminal plates each of which is disposed between each of the end plate and one of the fuel cell units disposed at each end of the fuel cell stack, and a pair of electrical insulators each of which is disposed between each of the end plates and each of the terminal plates, and each of the electrical heaters may be disposed between each of the terminal plates and each of the electrical insulators.

In the control apparatus for a fuel cell stack, each of the electrical heaters may be embedded in each of the end plates.

In the control apparatus for a fuel cell stack, the control unit may be adapted to execute the power generation operation in the fuel cell stack in order to supply electrical energy to the electrical heaters.

In the control apparatus for a fuel cell stack, the water purging device may include: a compressor which is connected to an end of the fuel cell stack for supplying gas for water purging into the fuel cell units, and which is operatively connected to the control unit; and a purging valve which is connected to the other end of the fuel cell stack for regulating flow of water purged from the fuel cell units, and which is operatively connected to the control unit.

The control apparatus for a fuel cell stack may further include temperature sensors for measuring temperature of the fuel cell units, and the control unit may be adapted to control the electrical heaters depending on the temperature of the fuel cell units measured by the temperature sensors.

In the control apparatus for a fuel cell stack, one of the temperature sensors may preferably be attached to one of the fuel cell units disposed in the middle of the fuel cell stack, and at least one of the temperature sensors may preferably be attached to at least one of the fuel cell units disposed near ends of the fuel cell stack.

In the above control apparatus for a fuel cell stack, the control unit may be adapted to control the electrical heaters depending on the difference between the temperature of at least one of the fuel cell units disposed in the middle of the fuel cell stack and the temperature of at least one of the fuel cell units disposed at the ends of the fuel cell stack.

The present invention also provides a method for controlling a fuel cell stack assembly. The fuel cell stack assembly includes: a fuel cell stack having a stacked body formed by stacking fuel cell units together and a pair of end plates sandwiching the stacked body therebetween; electrical heaters disposed near the ends of the stacked body or the end plates, respectively; and a water purging device for purging water which is generated during a power generation operation in the fuel cell stack, and which is held in the fuel cell units. The method includes the steps of: receiving a power generation stop command; operating the electrical heater for warming the fuel cell units disposed at ends of the fuel cell stack; operating the water purging device for purging the water held in the fuel cell units; and stopping the power generation in the fuel cell stack.

Alternatively, the method may include the steps of: receiving a power generation stop command; operating the electrical heater for warming the fuel cell units disposed at ends of the fuel cell stack and the water purging device for purging the water held in the fuel cell units, simultaneously; and stopping the power generation in the fuel cell stack.

DESCRIPTION OF THE PREFERRED EMBODIMENTS

Embodiments of the present invention will be explained below with reference to the appended drawings.

Figure 1:
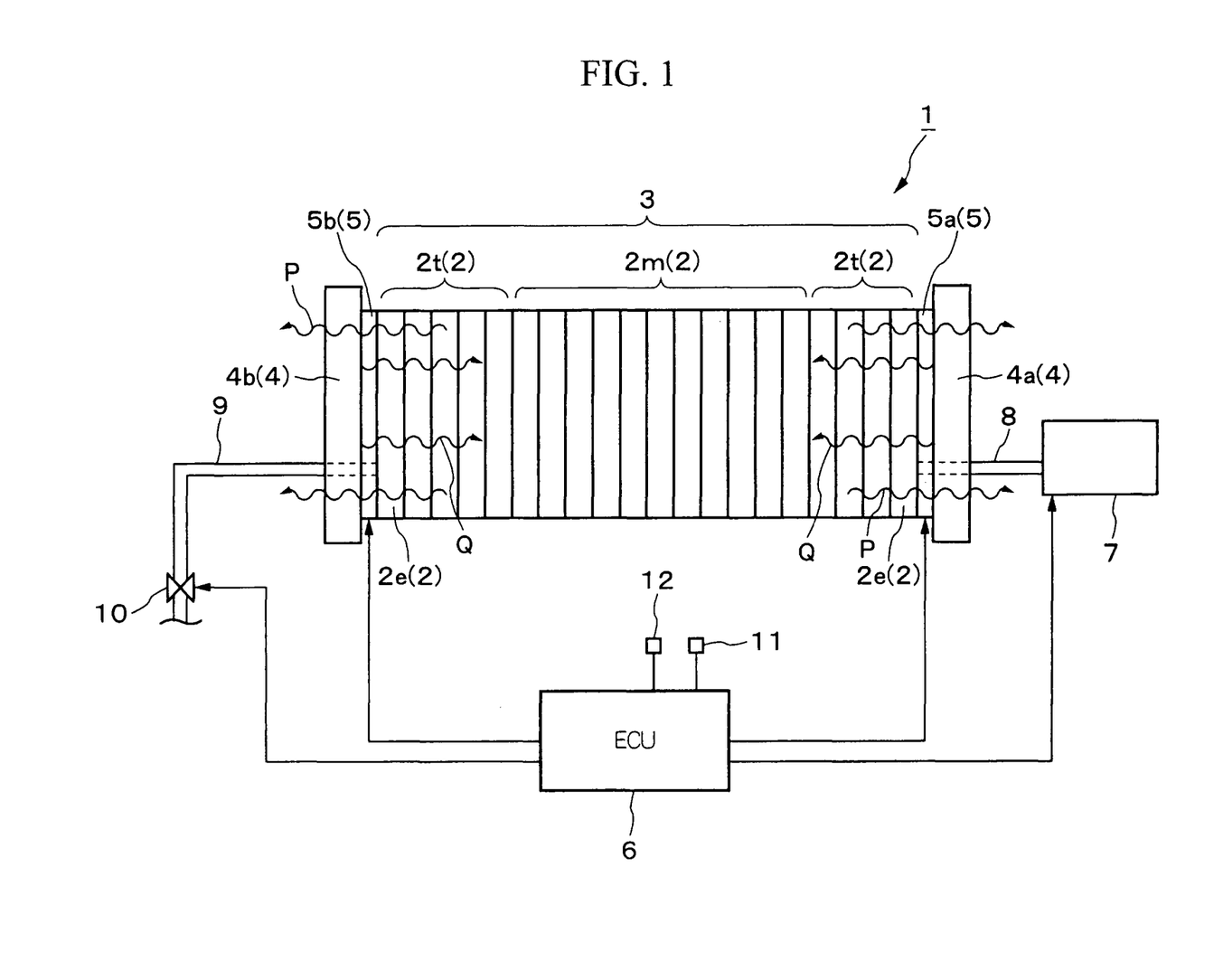
FIG. 1 is a schematic diagram showing the general structure of a control apparatus for a fuel cell stack as a basic embodiment of the present invention.

FIG. 1 is a schematic diagram showing the general structure of a control apparatus for a fuel cell stack as a basic embodiment of the present invention. A fuel cell stack 1 included in the control apparatus for a fuel cell stack has a stacked body 3 which is formed in a substantially rectangular parallelepiped shape by stacking a plurality of fuel cell units 2 together, each of which is formed in a substantially rectangular shape.

Each of the fuel cell units 2 includes a membrane electrode assembly, which is formed by sandwiching a solid polymer electrolyte membrane by an anode electrode and a cathode electrode, and a pair of separators which together hold the membrane electrode assembly. The solid polymer electrolyte membrane may be, for example, a perfluorosulfonate polymer having water impregnated thereinto. Each of the anode electrode and the cathode electrode is constructed, for example, by providing an electrode catalyst layer such as platinum on a surface of a gas diffusion layer formed from carbon impregnated paper or the like. The electrode catalyst layer of the anode electrode and the electrode catalyst layer of the cathode electrode together sandwich the solid polymer electrolyte membrane while being connected thereto.

Each of the fuel cell units 2 forming the stacked body 3 includes separators, in each of which communication ports are formed for supplying and discharging a fuel gas and an oxidizing gas as reaction gases. To each of outermost fuel cell units 2e, a mechanism is connected for supplying and discharging the reaction gases through the communication ports. The details of the mechanisms will not be explained herein.

Figure 2:
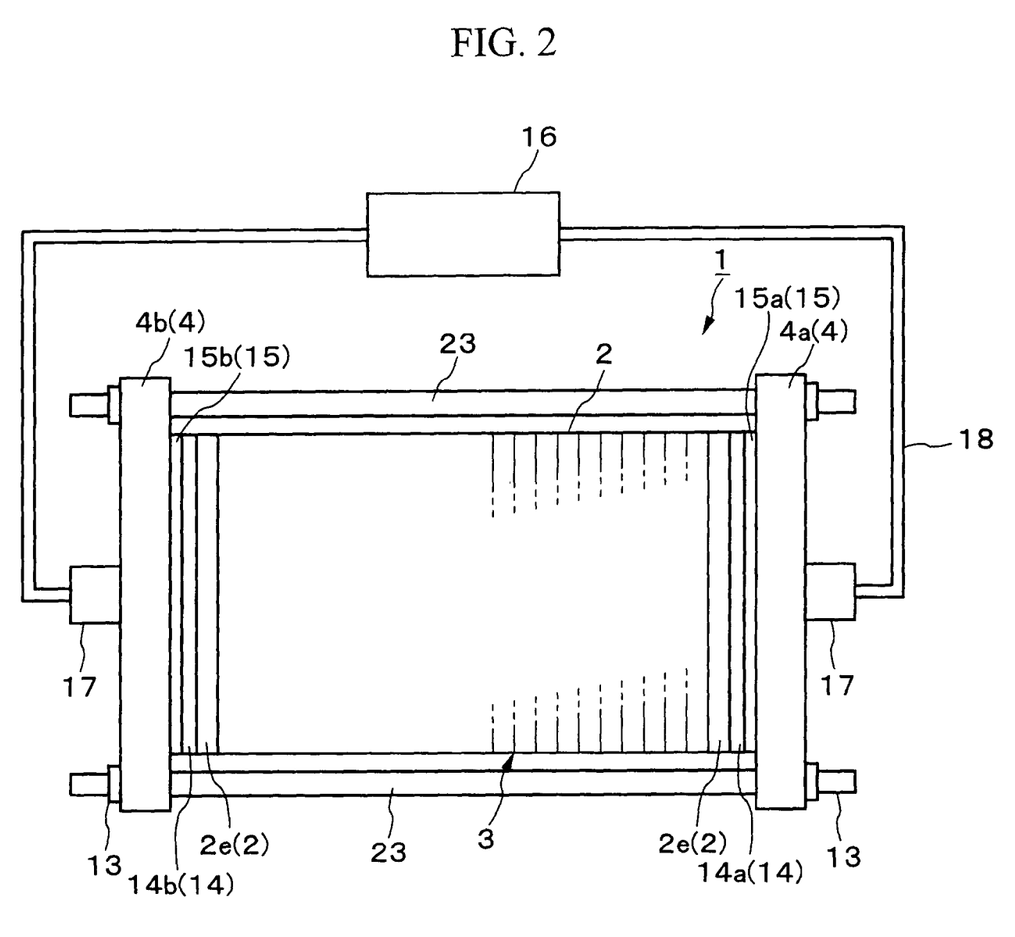
FIG. 2 is a side view of a fuel cell stack included in the control apparatus for a fuel cell stack of a first embodiment.

FIG. 2 is a side view of a fuel cell stack 1 in a first embodiment of the present invention. As shown in FIG. 2, the stacked body 3, which is formed by stacking the fuel cell units 2 together, is held between a pair of end plates 4 (4a and 4b) at the ends thereof via terminal plates 14 (14a and 14b) and electrical insulators 15 (15a and 15b).

The terminal plates 14, which are provided for taking out electrical energy by contacting the outermost fuel cell units 2e, are made of metal having high conductivity (e.g., copper), and are formed as plates having sizes substantially equal to that of the fuel cell units 2 as viewed in the stacking direction of the fuel cell units 2. The electrical insulators 15, which are provided for electrically insulating the terminal plate 14 from the end plate 4, are made of insulation material such as resin, and are formed as plates having sizes substantially equal to or slightly greater than that of the terminal plates 14.

Each of the pair of end plates 4 is formed in a substantially rectangular parallelepiped shape which is larger than the terminal plates 14 and the electrical insulators 15. In the pair of end plates 4, there are formed through holes near the four corners of each, the four corners of one of the end plates 4 facing the four corners of the other. Four rods 23 are provided in a manner such that each of the rods 23 penetrates a pair of through holes formed in the pair of end plates 4. By tightening nuts 13 as fastening elements screwed onto the rods 23 so as to press the end plates 4 toward each other, the stacked body 3 is held between the end plates 4 while applying appropriate pressure to the fuel cell units 2. The structure, in which the stacked body 3 is held between the end plates 4, is not limited to this, and a casing (not shown) may be provided in a state in which the stacked body 3 is held between the pair end plates 4 so as to surround the stacked body 3 and the pair end plates 4.

Figure 7:
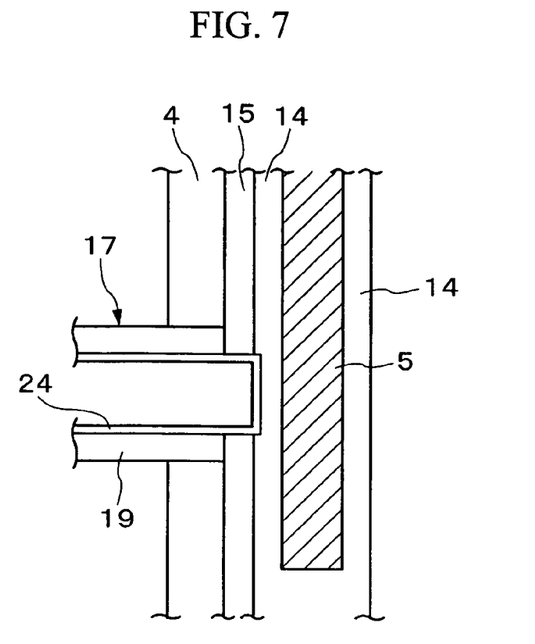
FIG. 7 is a cross-sectional view showing the main portion of the fuel cell stack.

FIG. 7 is a cross-sectional view showing the main portion of the fuel cell stack 1. As shown in FIG. 7, a projection portion 17 is provided on the terminal plate 14, which is located substantially in the center of the terminal plate 14, and which projects in the direction perpendicular to the terminal plate 14, i.e., in the stacking direction of the fuel cell units 2. The projection portion 17, which is formed in a substantially cylindrical shape, has a hollow structure, and includes a terminal joint 24 of metal, which contacts the terminal plate 14, and an electrical insulation tube 19 for preventing a short-circuit, which surrounds the outer surface of the terminal joint 24. To an external end of the terminal joint 24, a conductive line 18, which is connected to an external load 16, is connected so that the electrical power generated in the fuel cell units 2 can be supplied to the external load 18 (see FIG. 2).

Figure 8:
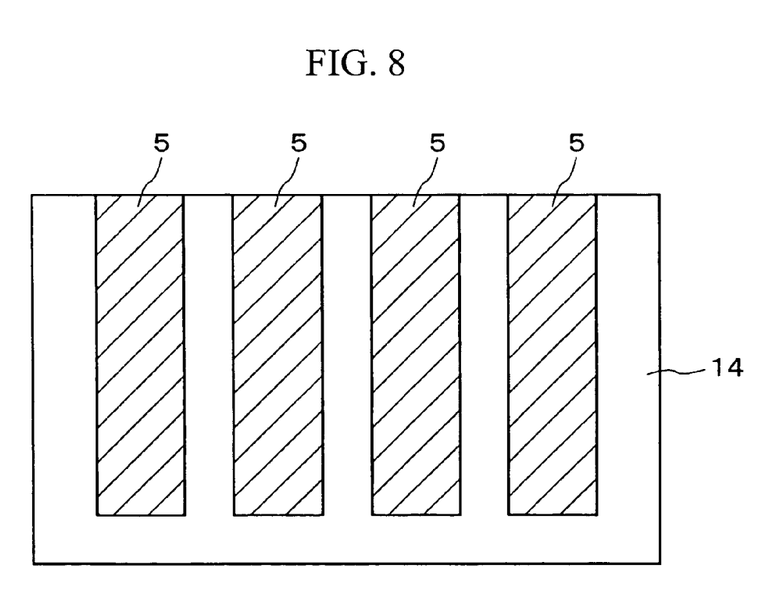
FIG. 8 is a plan view showing the electrical heaters shown in FIG. 7 and a terminal plate having the electrical heaters.

In this embodiment, electrical heaters 5 are embedded in the terminal plate 14. FIG. 8 is a plan view showing the electrical heaters 5 and the terminal plate 14 having the electrical heaters 5. The electrical heaters 5, each of which is formed in a substantially columnar shape, are embedded and arranged in the terminal plate 14 at a predetermined interval. Due to such a configuration, the entire surface of the outermost fuel cell unit 2e, which faces the terminal plate 14 having the electrical heaters 5, can be uniformly warmed using the electrical heaters 5.

In the fuel cell stack 1, a so-called purging operation is executed as necessary using a pressurized gas, i.e., gas for purging (e.g., air, an inert gas, or the like), in order to remove surplus water generated and held in the fuel cell units 2 so that preferable efficiency of power generation is ensured. To this end, the control apparatus for a fuel cell stack of this embodiment includes a compressor 7 for pressurizing and sending the gas for purging, and a purging gas supply passage 8. The compressor 7 is connected to an end of a reaction gas flow passage (not shown) provided in the fuel cell units 2 forming the stacked body 3 via the purging gas supply passage 8 so that the gas for purging is pressurized by the compressor 7 and is supplied to the reaction gas flow passage.

The control apparatus further includes a purging gas discharge passage 9 which is connected to the other end of the reaction gas flow passage, and through which the gas for purging supplied to the reaction gas flow passage is discharged to the exterior of the fuel cell stack 1. The purging gas discharge passage 9 is provided with a purge valve 10. The purging gas discharge passage 9 is opened and closed by operating the purge valve 10. The gas for purging may be air, an inert gas, or the like. When air is used as the gas for purging, the compressor 7 may be made to act as a compressor which supplies the oxidizing gas (reaction gas) to the fuel cell units 2.

The control apparatus for a fuel cell stack further includes an ECU 6 (a control unit) to which the electrical heater 5, the compressor 7, and the purge valve 10 are connected. The ECU 6 is provided for controlling the operation of the electrical heaters 5, the operation of the compressor 11, and for executing an open and close control of the purging valve 10. The ECU 6 is electrically connected to an end temperature sensor 11 for measuring the temperature of end fuel cell units 2t which are disposed near the ends of the fuel cell stack 1, and to a middle temperature sensor 12 for measuring the temperature of middle fuel cell units 2m which are disposed in the middle of the fuel cell stack 1 so that the ECU 6 performs the control operation for the electrical heaters 5 based on the temperatures of the fuel cell units 2m and 2t, which are measured by the temperature sensors 11 and 12, respectively.

In the control apparatus for a fuel cell stack configured as described above, the reaction gases are supplied to each of the fuel cell units 2 for forming the stacked body 3 so that power generation is performed in each of the fuel cell units 2.

Figure 5:
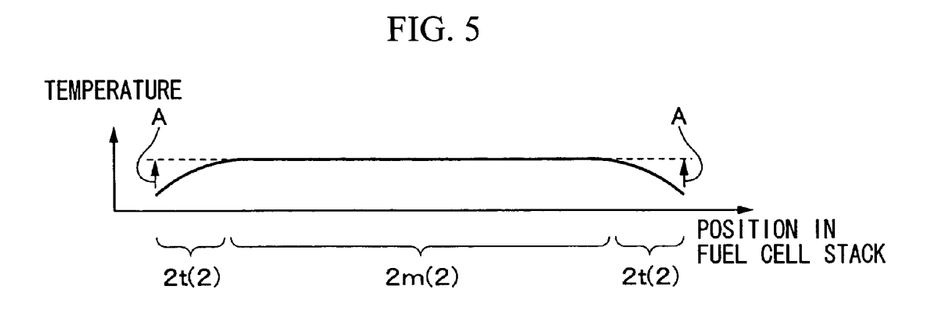
FIG. 5 is a graph showing the relationship between position of the fuel cell units and the temperature of each of the fuel cell units.

As mentioned above, because water is generated in the fuel cell units 2 during power generation, the amount of generated water in the fuel cell units 2 increases as power generation continues. In addition, the temperature of each of the fuel cell units 2 is higher than the ambient temperature due to heat produced by power generation. Because the heat is released to the exterior of the fuel cell units 2, as schematically indicated by the arrows P in FIG. 1, the temperature of the end fuel cell units 2t tends to be lower than that of the middle fuel cell units 2m as shown in FIG. 5.

Figure 6:
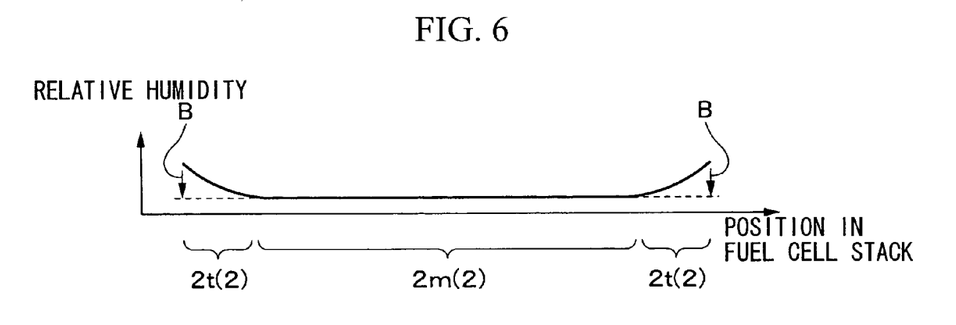
FIG. 6 is a graph showing the relationship between position of the fuel cell units and the relative humidity in each of the fuel cell units.

Due to this, when the amount of power generation in each of the fuel cell units 2 is substantially equal to each other, and thus, when the amount of generated water in each of the fuel cell units 2 is substantially equal to each other, the relative humidity in the end fuel cell units 2t tends to be higher than that of the middle fuel cell units 2m as shown in FIG. 6. In this state, even when the above-mentioned purging operation is executed in each of the fuel cell units 2, the end fuel cell units 2t tend to have more water than that held in the middle fuel cell units 2m.

Based on this reason, in this embodiment, before executing the purging operation, the ECU 6 controls the electrical heaters 5 so that the end fuel cell units 2t are warmed up. The series of control operations including the heating operation will be explained below.

Figure 3:
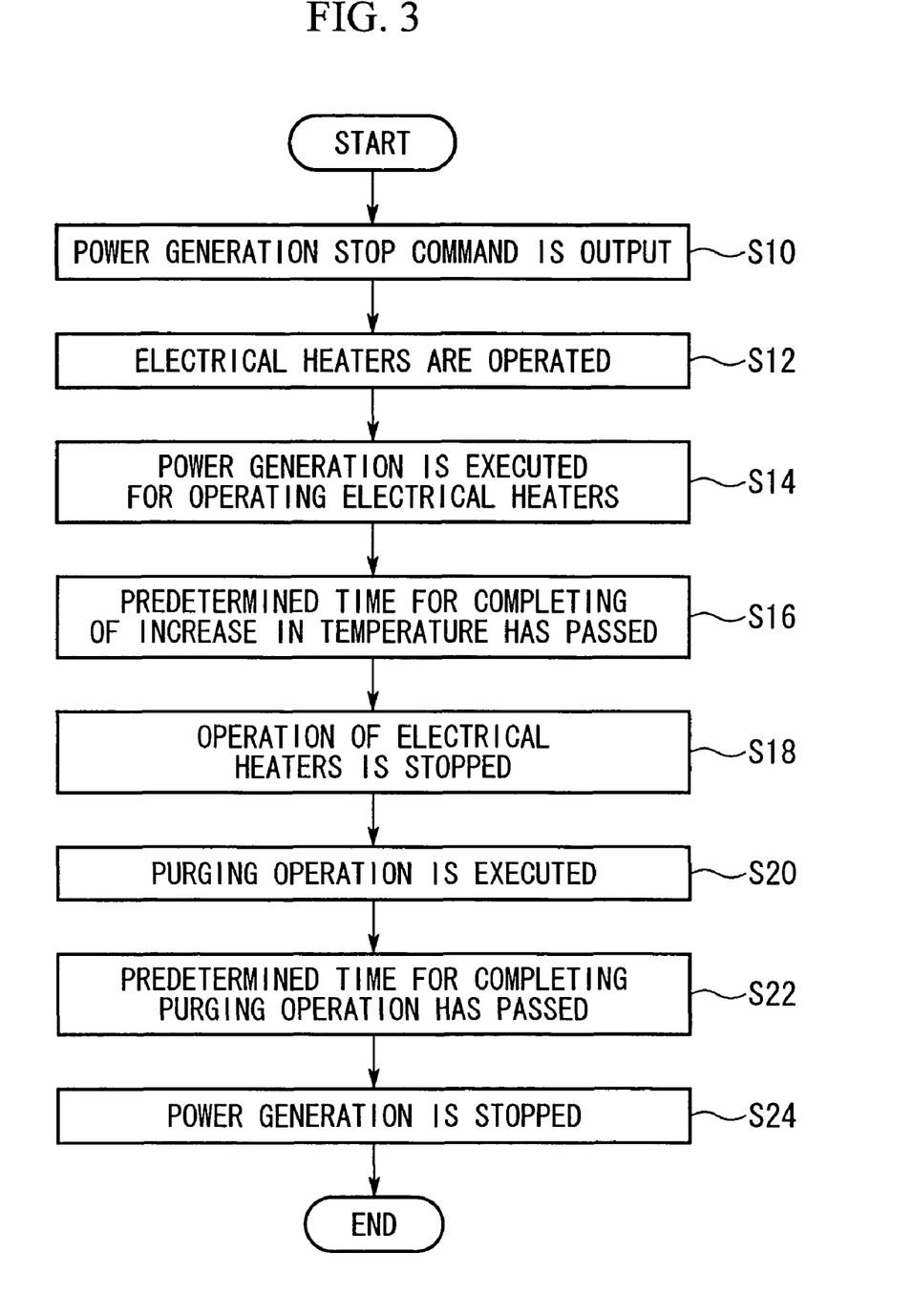
FIG. 3 is a flow chart showing an example of the operation for dealing with water held in each of fuel cell units of the fuel cell stack.

FIG. 3 is a flow chart showing a control operation when power generation in the fuel cell stack 1 is to be stopped. In step S10, a power generation stop command for stopping power generation in the fuel cell units 2 is output; however, power generation is not immediately stopped. In step S12, the ECU 6 makes the electrical heaters 5 operate so that the end fuel cell units 2t are warmed, as schematically indicated by the arrows Q in FIG. 1. The ECU 6 controls the electrical heaters 5 based on the difference between the temperature of the end fuel cell units 2t, which is measured by the end temperature sensor 11, and the temperature of the middle fuel cell units 2m, which is measured by the middle temperature sensor 12. In step S14, the ECU 6 controls the fuel cell units 2 so that electrical power for operating the electrical heaters 5 is generated.

In step S16, it is determined by the ECU 6 that a predetermined time has passed which is required for increasing the temperature of the end fuel cell units 2t to a level substantially equal to the temperature of the middle fuel cell units 2m. In step S18, the ECU 6 makes the operation of the electrical heaters 5 stop. Because the temperature of the end fuel cell units 2t has risen, as schematically indicated by the arrows A in FIG. 5, so as to be substantially equal to the temperature of the middle fuel cell units 2m, the relative humidity in the end fuel cell units 2t has fallen, as schematically indicated by the arrows B in FIG. 6, so as to be substantially equal to the relative humidity in the middle fuel cell units 2m; therefore, the amount of water held in each of the fuel cell units 2 is substantially equal to each other. In step S20 the purging operation is executed in order to discharge and remove water from each of the fuel cell units 2. The electrical power to operate the compressor 7, which is provided for pressurizing and sending the gas for purging, is supplied by the fuel cell units 2. In step S22, it is determined by the ECU 6 that a predetermined time for completing the purging operation has passed. In step S24, the power generation operation is stopped by the ECU 6, and the series of operations is terminated.

Through the above processes, the amount of water held in each of the fuel cell units 2 is made substantially equal to each other; therefore, the water can be uniformly discharged from the fuel cell units 2 by the above purging operation. Accordingly, the end fuel cell units 2t may not have surplus water therein after the purging operation, and thus the efficiency of power generation at the restarting of the fuel cell stack 1 can be increased.

Moreover, in this embodiment, the electrical heaters 5 are operated first, and the water is discharged from the fuel cell units 2 after a predetermined time has passed which is required for increasing the temperature of the end fuel cell units 2t to a level substantially equal to the temperature of the middle fuel cell units 2m; therefore, the relative humidity in the fuel cell units 2 is made substantially uniform, and the water held in the fuel cell units 2 can be reliably discharged.

Figure 4:
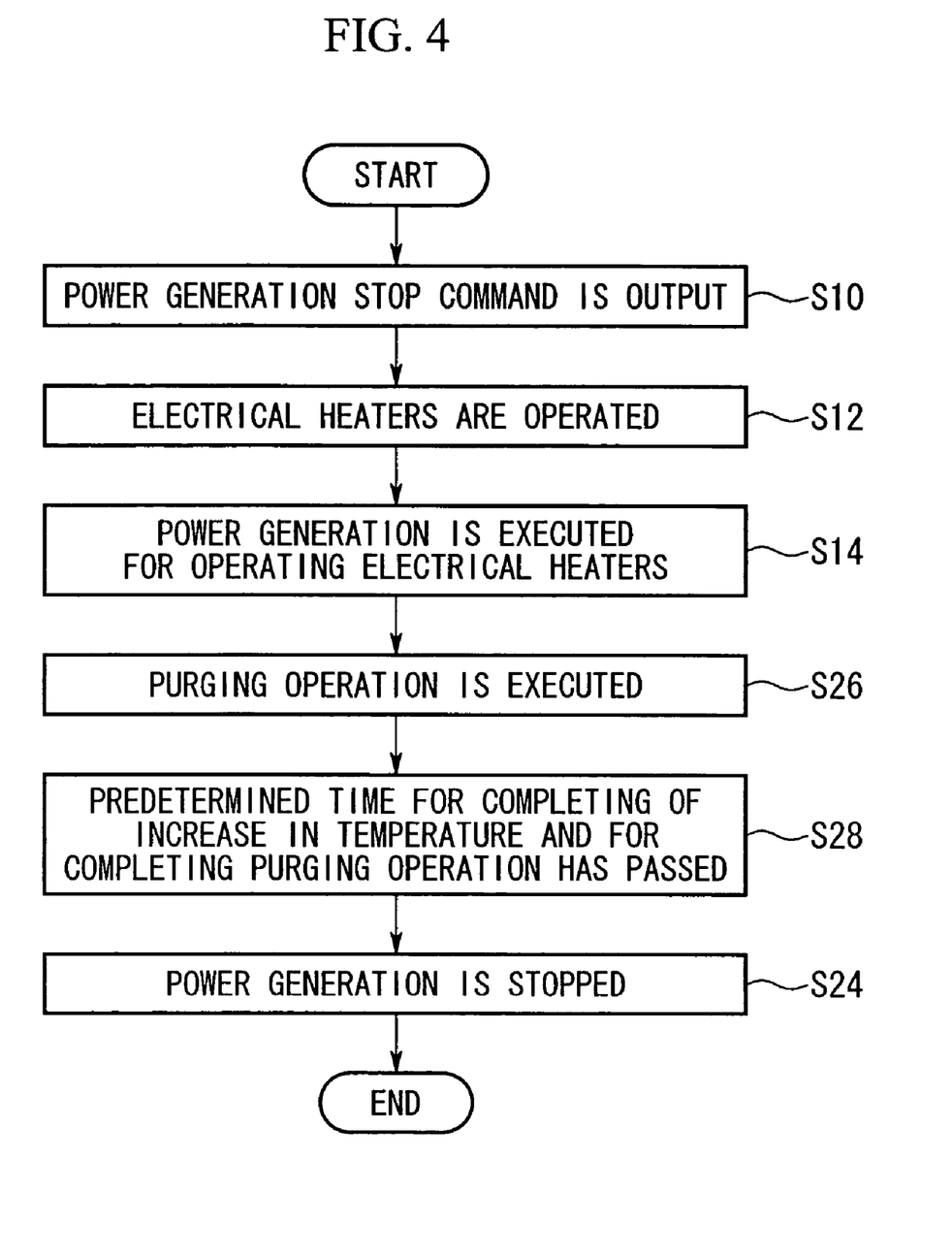
FIG. 4 is a flow chart showing another example of the operation for dealing with water held in each of fuel cell units of the fuel cell stack.

FIG. 4 is a flow chart showing another example of a control operation when power generation in the fuel cell stack 1 is to be stopped. In FIG. 4, the same reference symbols are applied to the same operations shown in FIG. 3, and explanations thereof may be omitted. In this case, when the electrical heaters 5 are operated so as to warm up the end fuel cell units 2t as indicated by step S12, the purging operation is simultaneously executed as indicated by step S26 so that the water held in the fuel cell units 2 is discharged to the exterior of the fuel cell stack 1. In step S28, it is determined that a predetermined time has passed which is required for increasing the temperature of the end fuel cell units 2t to a level substantially equal to the temperature of the middle fuel cell units 2m, and to complete the purging operation, and then the power generation operation is stopped by the ECU 6 in step S24.

By simultaneously executing the heating operation and the purging operation as described above, the time for completing discharging of water can be made less than in the case in which the purging operation is executed after the heating operation, and the power generation operation may be stopped earlier.

Next, other embodiments of the fuel cell stack according to the present invention will be explained below.

Figure 9:
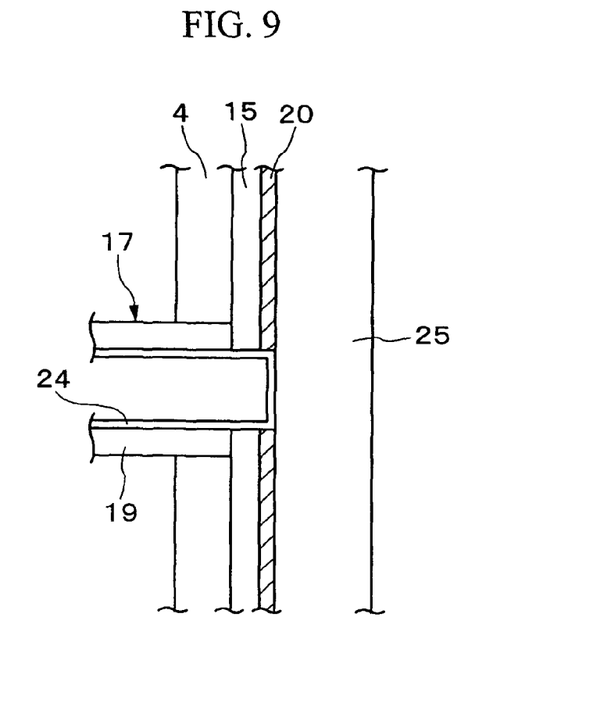
FIG. 9 is a cross-sectional view showing a second embodiment of a fuel cell stack.
Figure 10:
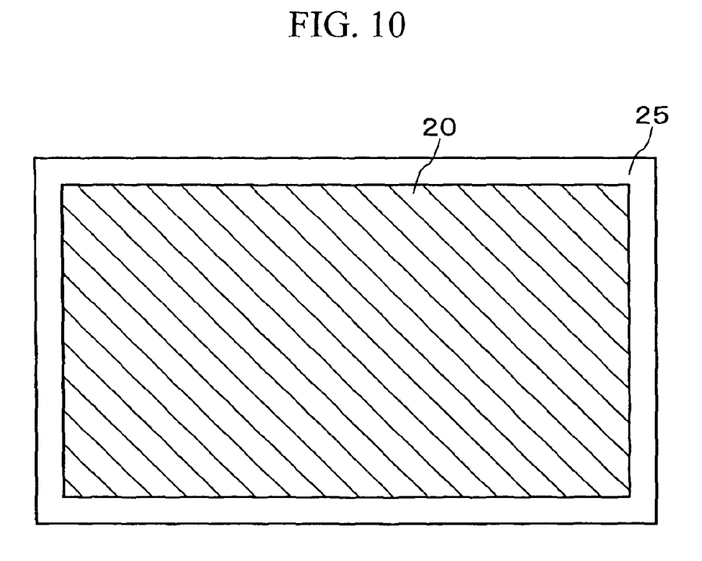
FIG. 10 is a plan view showing the electrical heater shown in FIG. 9 and the terminal plate having the electrical heater.

FIG. 9 is a cross-sectional view showing a second embodiment of the fuel cell stack according to the present invention. FIG. 10 is a plan view showing the electrical heater 20 shown in FIG. 9 and the terminal plate 25 having the electrical heater 20. The second embodiment of the fuel cell stack 1 differs from the first embodiment in that the electrical heater 20 is formed in a substantially rectangular shape which is slightly smaller than the terminal plate 25, and the electrical heater 20 is inserted between the terminal plate 25 and the electrical insulator 15.

Figure 11:
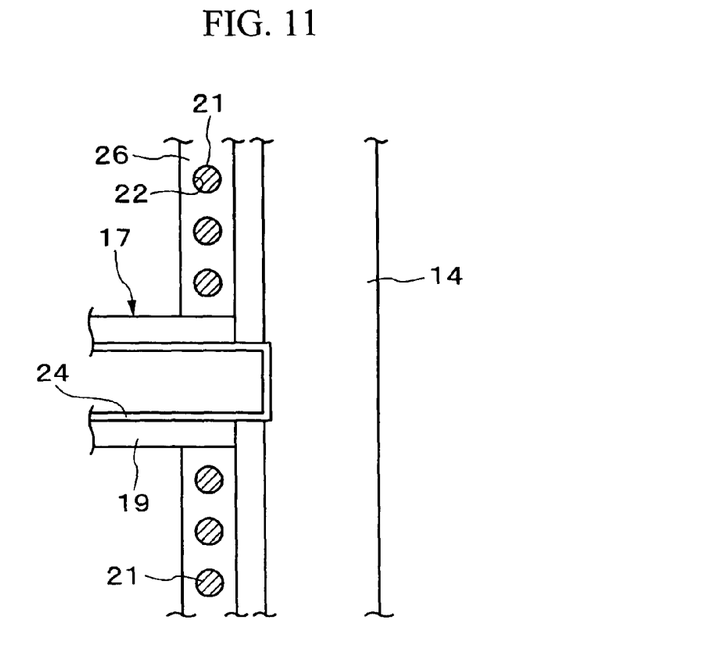
FIG. 11 is a cross-sectional view showing a third embodiment of a fuel cell stack.
Figure 12:
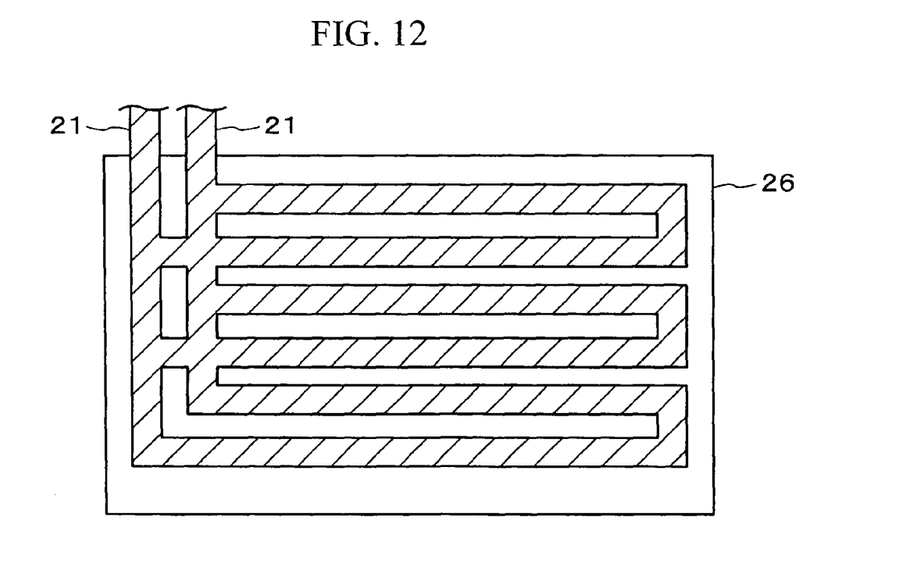
FIG. 12 is a plan view showing the electrical heater shown in FIG. 11 and the terminal plate having the electrical heater.

Moreover. FIG. 11 is a cross-sectional view showing a third embodiment of the fuel cell stack according to the present invention. FIG. 12 is a plan view showing the electrical heater 21 shown in FIG. 11 and the end plate 26 having the electrical heater 21. The third embodiment of the fuel cell stack 1 differs from the first embodiment in that the electrical heater 21 is formed to be substantially zigzagging, and the electrical heater 21 is embedded in the end plate 26.

As described above, the electrical heater does not have to be embedded in the terminal plate as in the first embodiment, and the electrical heater may be inserted between the terminal plate and the electrical insulator, or embedded in the end plate as in the second and third embodiments.

While preferred embodiments of the control apparatus for a fuel cell stack according to the present invention have been described and illustrated above, it should be understood that these are exemplary of the invention and are not to be considered as limiting. Additions, omissions, substitutions, and other modifications can be made without departing from the spirit or scope of the present invention.

For example, in the above embodiments, the electrical power for operating the electrical heaters 5 is supplied from the fuel cell units 2; however, the electrical power may be supplied from other electricity storage device such as a battery or capacitor. Moreover, in the above embodiments, the operation of the electrical heaters 5 is controlled by the ECU 6 based on the temperatures measured by the temperature sensors 11 and 12; however, the manner of control is not limited to this, and a map may be prepared in advance, which defines the relationship between time over which the electrical heaters 5 are operated, and increase in the temperature of the end fuel cell units 2t, and the electrical heaters 5 may be operated for a time determined by the map. Furthermore, the shape and position of the electrical heater are not limited to the above embodiments, and may further be modified.

ADVANTAGEOUS EFFECTS OBTAINABLE BY THE INVENTION

As explained above, according to the control apparatus for a fuel cell stack of the present invention, because the temperature of the fuel cell units can be made uniform, and the relative humidity in the fuel cell units can be made uniform when the power generation in the fuel cell stack is stopped, the end fuel cell units may not have surplus water therein after the purging operation, and thus the efficiency of power generation at the restarting of the fuel cell stack can be increased.

According to another control apparatus for a fuel cell stack of the present invention, the efficiency of discharging the water from the fuel cell units through the purging operation can be increased.

According to another control apparatus for a fuel cell stack of the present invention, the time for completing discharging of water can be reduced, and the power generation operation may be stopped earlier.

What is claimed is:

1. A control apparatus for a fuel cell stack comprising:
a solid polymer electrolyte fuel cell stack having a stacked body formed by stacking fuel cell units together and a pair of end plates sandwiching the stacked body therebetween;
electrical heaters disposed near the ends of the stacked body or the end plates, respectively;
a water purging device for purging water which is generated during a power generation operation in the solid polymer electrolyte fuel cell stack, and which is held in the fuel cell units;
temperature sensors for measuring temperature values of the fuel cell units, wherein a first one of the temperature sensors is attached to one of the fuel cell units disposed in the middle of the fuel cell stack, and at least a second one of the temperature sensors is attached to at least a one of the fuel cell units disposed near ends of the fuel cell stack; and
a control unit which controls the power generation operation in the solid polymer electrolyte fuel cell stack, and which is operatively connected to the electrical heaters and the water purging device, wherein the control unit is adapted to:
operate the electrical heaters and the water purging device when a power generation stop command for stopping the power generation operation in the solid polymer electrolyte fuel cell stack is output to maintain a uniform temperature and uniform relative humidity across the fuel cell units and to prevent a surplus of water in the fuel cell units disposed near the ends of the fuel cell stack;
control the electrical heaters depending on the temperature values of the fuel cell units measured by the temperature sensors, wherein controlling the electrical heaters is based on a difference between a first temperature value of at least one of the fuel cell units disposed in the middle of the fuel cell stack and a second temperature value of at least one of the fuel cell units disposed at the ends of the fuel cell stack.

2. A control apparatus for a fuel cell stack according to claim 1, wherein the control unit is adapted to operate the electrical heaters and the water purging device prior to stopping of the power generation operation.

3. A control apparatus for a fuel cell stack according to claim 1, wherein the control unit is adapted to operate the electrical heaters first, and then to operate the water purging device when a predetermined time has passed since the beginning of operation of the electrical heaters.

4. A control apparatus for a fuel cell stack according to claim 1, wherein the control unit is adapted to simultaneously operate the electrical heaters and the water purging device.

5. A control apparatus for a fuel cell stack according to claim 1, wherein each of the electrical heaters is disposed between each of the end plates and one of the fuel cell units disposed at each end of the fuel cell stack.

6. A control apparatus for a fuel cell stack according to claim 1,
wherein the fuel cell stack further includes a pair of terminal plates each of which is disposed between each of the end plate and one of the fuel cell units disposed at each end of the fuel cell stack, and
wherein each of the electrical heaters is embedded in each of the terminal plates.

7. A control apparatus for a fuel cell stack according to claim 1,
wherein the fuel cell stack further includes a pair of terminal plates, each of which is disposed between each of the end plate and one of the fuel cell units disposed at each end of the fuel cell stack, and a pair of electrical insulators each of which is disposed between each of the end plates and each of the terminal plates, and
wherein each of the electrical heaters is disposed between each of the terminal plates and each of the electrical insulators.

8. A control apparatus for a fuel cell stack according to claim 1, wherein each of the electrical heaters is embedded in each of the end plates.

9. A control apparatus for a fuel cell stack according to claim 1, wherein the control unit is adapted to execute the power generation operation in the fuel cell stack in order to supply electrical energy to the electrical heaters.

10. A control apparatus for a fuel cell stack according to claim 1, wherein the water purging device comprises:
a compressor which is connected to an end of the fuel cell stack for supplying gas for water purging into the fuel cell units, and which is operatively connected to the control unit; and
a purging valve which is connected to the other end of the fuel cell stack for regulating flow of water purged from the fuel cell units, and which is operatively connected to the control unit.

11. A control apparatus for a fuel cell stack according to claim 1, wherein the electrical heaters are adapted to heat the fuel cell stack.

* * * * *